March 3, 1942.  A. L. PARKER  2,274,731
VALVE ASSEMBLY FOR FUEL SYSTEMS
Filed March 17, 1941.  3 Sheets-Sheet 1
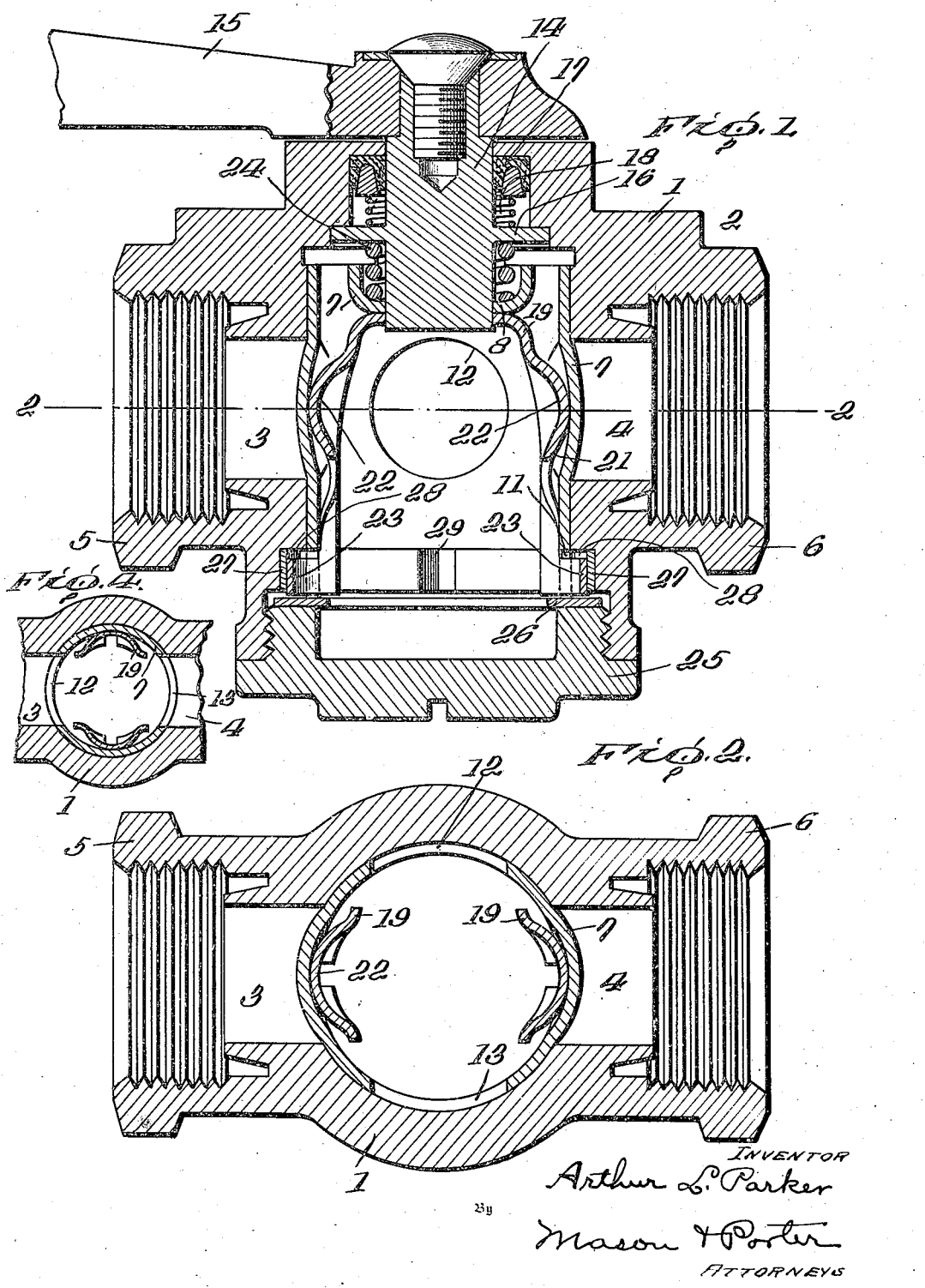
INVENTOR
Arthur L. Parker
By
Mason & Porter
ATTORNEYS March 3, 1942.   A. L. PARKER   2,274,731
VALVE ASSEMBLY FOR FUEL SYSTEMS
Filed March 17, 1941   3 Sheets-Sheet 2
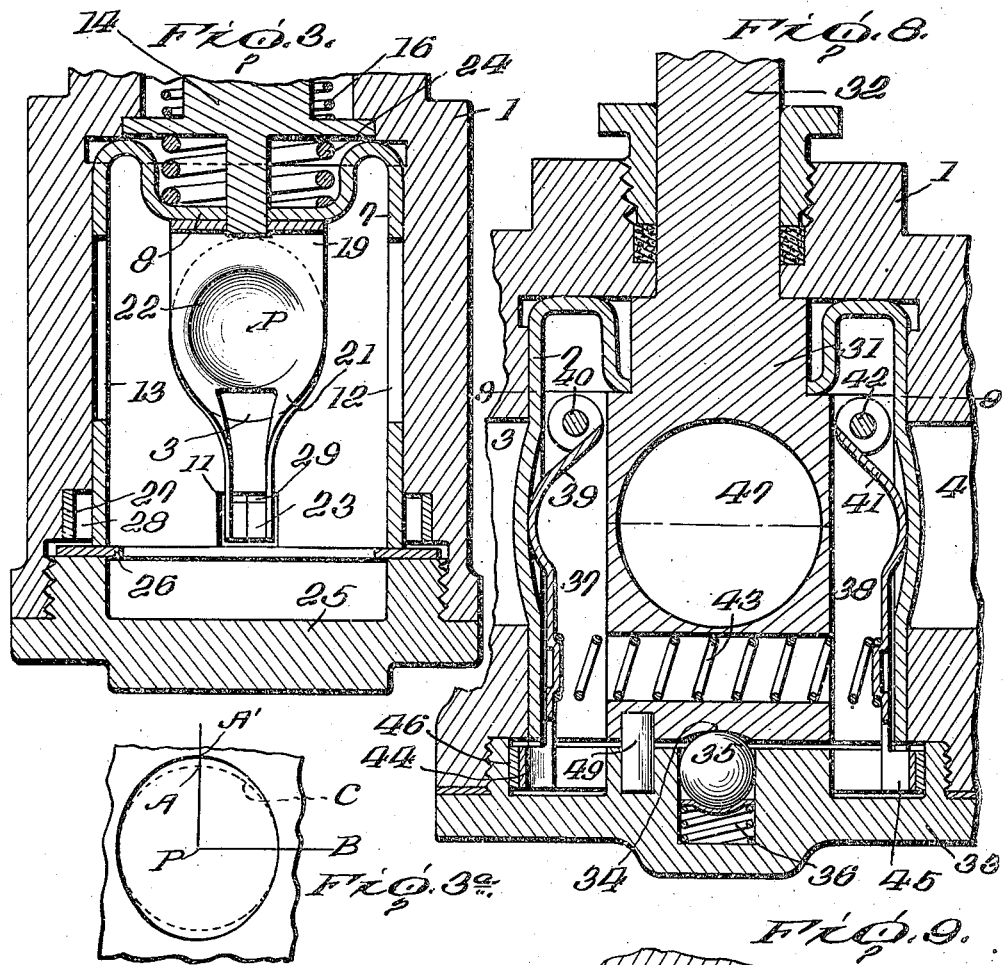
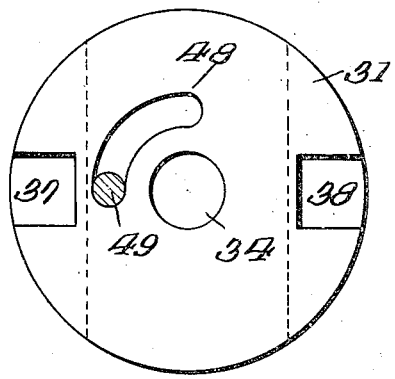
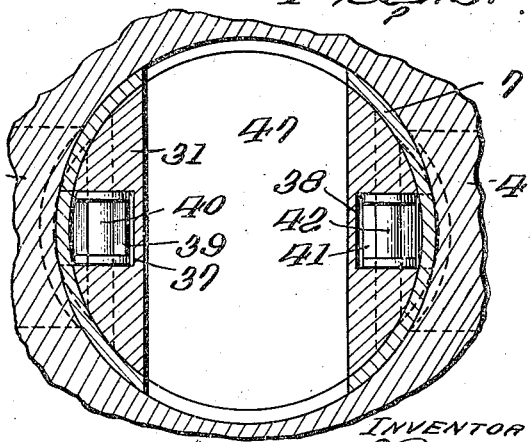
INVENTOR
Arthur L. Parker
By Mason & Porter
ATTORNEYS March 3, 1942.         A. L. PARKER         2,274,731
VALVE ASSEMBLY FOR FUEL SYSTEMS
Filed March 17, 1941         3 Sheets-Sheet 3

INVENTOR
Arthur L. Parker
Mason & Porter
ATTORNEYS

Patented Mar. 3, 1942

2,274,731

UNITED STATES PATENT OFFICE 2,274,731

VALVE ASSEMBLY FOR FUEL SYSTEMS

Arthur L. Parker, Cleveland, Ohio

Application March 17, 1941, Serial No. 383,826

12 Claims. (Cl. 251—96)

The invention relates to new and useful improvements in a valve assembly for fuel systems, and more particularly to a valve assembly such as shown in the patent granted Arthur L. Parker, March 30, 1937, No. 2,075,459, wherein a relatively thin wall is flexed into the port of the valve casing for closing the same to afford a tight seal.

An object of the invention is to provide a valve assembly of the above type wherein the spring-actuated means for flexing the valve into the port is released upon the initial turning movement of the valve to open the same so as to reduce the torque necessary for moving the valve and so as to reduce the wear on the valve and the valve casing where they contact with each other.

A further object of the invention is to provide a valve assembly of the above type wherein the valve port is so shaped that a cylindrical valve flexed into the port will be pressed against the valve seat substantially uniformly all the way around the same.

A still further object of the invention is to provide a valve assembly of the above type wherein the spring-actuated means for flexing the wall of the valve is controlled by a stationary member so shaped as to permit said spring-actuated means to flex the valve into the port controlled thereby when the valve is in closing position, and which renders said spring-actuated means inactive to flex the wall of the valve upon the initial turning of the valve from closed position.

A still further object of the invention is to provide a valve assembly of the above type wherein said stationary member controlling the spring-actuated means operates to yieldingly hold the valve in open position and also in closed position.

These and other objects will in part be obvious and will in part be hereinafter more fully described.

In the drawings—

Figure 1 is a sectional view through a valve assembly embodying the invention;

Fig. 2 is a sectional view on the line 2—2 of Figure 1;

Fig. 3 is a longitudinal sectional view through the valve assembly showing the modified shaping of the port controlled by the valve;

Fig. 3a is a diagrammatic view showing a port which is oval in cross section in comparison with a port which is cylindrical in cross section;

Fig. 4 is a view on a small scale similar to Figure 2, but showing the valve in open position;

Fig. 8 is a vertical sectional view through the valve assembly showing a modified form of means for flexing the wall of the valve;

Fig. 9 is a sectional view on the line 9—9 of Figure 8, and

Fig. 10 is a bottom end view of the valve-actuating member.

Figure 5:
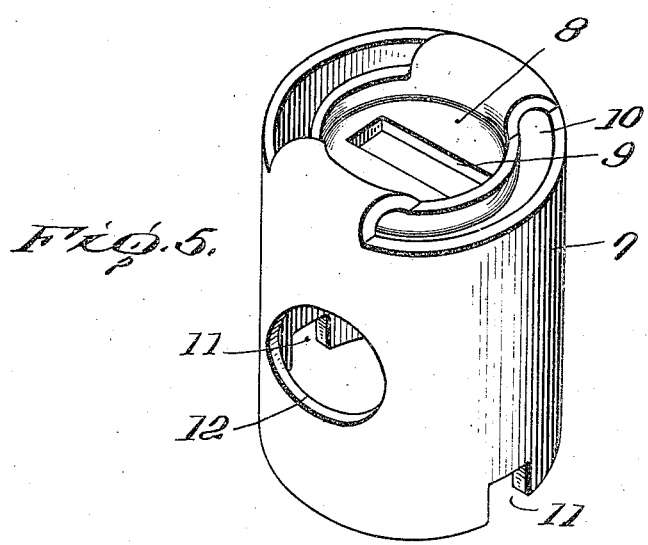
Fig. 5 is a perspective view of the valve.
Figure 6:
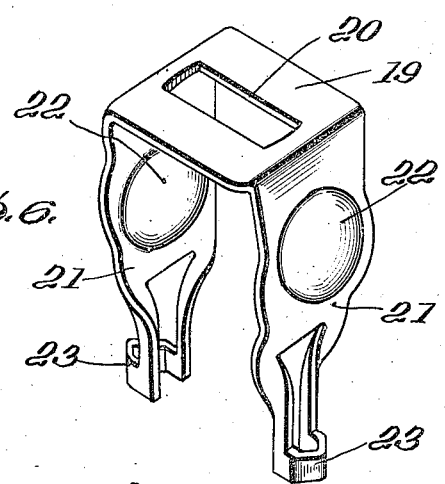
Fig. 6 is a perspective view of the spring-actuated means which flexes the wall of the valve and which also holds the valve in a set position.

In the embodiment of the invention shown in Figures 1 to 7, the valve assembly includes a casing 1 having a cylindrical chamber 2 formed therein. There is a port 3 at one side of the valve housing which leads through the cylindrical wall of the housing. There is also a port 4 in the cylindrical wall of the housing, and these ports 3 and 4 are disposed diametrically opposite each other relative to the cylindrical chamber. The port 3 leads to an extension 5 to which a pipe may be connected by any suitable means. The port 4 likewise leads to an extension 6 to which a pipe may be secured by any suitable means. These ports 3 and 4 are controlled by a valve 7 which is in the form of a cylindrical shell (see Figure 5). Said cylindrical shell has one end closed, and this closed end is shaped so as to provide an operating disk 8 having a rectangular slot 9 therethrough. The upper end of the valve is cut away at 10, 10. The lower end of the valve is open, and this together with the cutaway portion, reduces the rigidity of the valve and makes it more easily flexed when it is desired to expand the wall into a valve port for tightly sealing the same. This cylindrical valve is cut away or recessed at its bottom portion as shown at 11, for purposes which will be hereinafter more fully disclosed. There is an opening 12 through the wall of the valve 7 and a corresponding opening 13 at the opposite side thereof.

Mounted in the valve casing is a valve actuating member 14 to which a handle 15 is attached. The valve actuating member 14 extends through the upper wall of the valve casing and this valve actuating member is provided with a projecting disk-shaped portion 16 located centrally thereof, which disk-shaped portion 16 contacts with the valve casing and insures that the valve actuating member will turn freely in the valve casing. A packing 17 is provided for the valve actuating member and a spring 18 bears against the packing and projecting disk-shaped portion 16 so as to force the packing into tight contact with the valve casing.

The cylindrical valve 7 is made of relatively thin metal which can be readily flexed. When the valve is positioned for closing the ports 3 and 4, then the wall of the valve is flexed into the port as shown in Figure 1, and this will afford a very tight sealing contact between the valve and the valve seat surrounding the port. The means for flexing the wall of the valve is shown in perspective in Figure 6. This flexing means consists of a member 19 having a rectangular opening 20 therethrough which is dimensioned to correspond to the opening 9 in the valve member. The lower end of the valve actuating member 14 extends into these rectangular openings and serves as a means of connection between the valve actuating member and the valve, on the one hand, and the spring-actuated control member 19 on the other hand. Said control member 19 includes depending legs 21, 21, each of which is provided with an outwardly bulging portion 22, 22. The lower end of each leg is cut away and the metal bent so as to provide V-shaped members 23 which face away from each other. This control member 19 is placed inside of the cylindrical valve 7 and bears at its upper end against the under side of the operating disk 8 of the valve. There is a spring 24 which bears against the upper face of the operating disk 8 and the under face of the disk 16, and this spring will operate to hold the valve 7 and the control-member 19 in proper position in the valve casing. The valve casing is closed at the lower end thereof by a cap plate 25. There is a spacer washer 26 between this cap plate 25 and the lower end of the valve. This will maintain the valve cylinder and the control member or spreader for the valve in a proper vertical position.

Associated with the spreader or control member 19 is a stationary ring 27 provided with V-shaped notches 28 and 29. The notches 28 are cut deeper into the ring than the notches 29. This ring 27 is located in the lower portion of the valve casing directly above the washer 26, and the lower ends 23 of the spreader or control member contact with the inner face of the ring. This control member is so tensioned that the legs are forced outward into contact with the inner surface of the ring. When the parts are positioned as shown in Figure 1, then the deep V-shaped notches 28 will permit the legs to spread outward, and the outwardly bulging portions 22 will be forced into contact with the wall of the valve and flex the valve outwardly into the ports 3 and 4, thus making a very tight seal.

When it is desired to open the valve, the handle 15 is turned and during the initial turning movement, the V-shaped members 23 will ride up out of the V-shaped notches 28 onto the inner surface 30 of the stationary control ring 27. This will force the legs of the control member inwardly and relieve the pressure of the outwardly bulging portions 22, 22 against the inner wall of the valve. The valve will spring back to its normal cylindrical shape and can be very freely turned in the valve casing until the ports 12 and 13 are brought, respectively, into alignment with the ports 3 and 4. When these ports 12 and 13 are lined up with the ports 3 and 4, the V-shaped members 23 will then enter the notches 29 which are merely holding notches, preventing shifting movements of the valve until pressure is applied to the handle for the turning of the same. The V-shaped notches 28 are so positioned that when the V-shaped projecting portions 23 are fully seated therein, then the centers of the ports in the valve will be in alignment with the centers of the ports in the valve casing.

When the port 3 is circular in cross section it will intersect the cylindrical valve in a line which is at all points equal distance from the center of the axial line of the port. Such a line of intersection is indicated at C in Figure 3a of the drawings. The line P—A is a straight line extending lengthwise of the cylindrical valve, while the line P—B is a curved line, and is, therefore, of greater length than the line P—A. When pressure is applied at the point P to expand the cylinder outward into the bore as shown in Figure 1, it must act on the longer section of metal to reach the point B than it would to reach the point A.

In Figure 3, the port is shown as modified in cross section so that instead of being rounded or circular in cross section, it is oval in shape. In Figure 3a, the oval-shaped port is indicated in full lines. The distance from P, which is the axial line of the port, to A', a point on the cylindrical valve intersected by the oval port, is now the same in length as the arc-shaped line P—B. With this oval contour of the port where the points of intersection of the cylinder are the same distance from the axial line of the port, the outward expansion of the cylinder will act through a uniform amount of metal to reach any point on the circumference of the line contact between the edge of the port and the cylindrical valve and this will produce a uniform sealing tension at every point of the rim of the bore through the pressure exerted on the valve cylinder and the flexing of the valve cylinder into the port.

Figure 7:
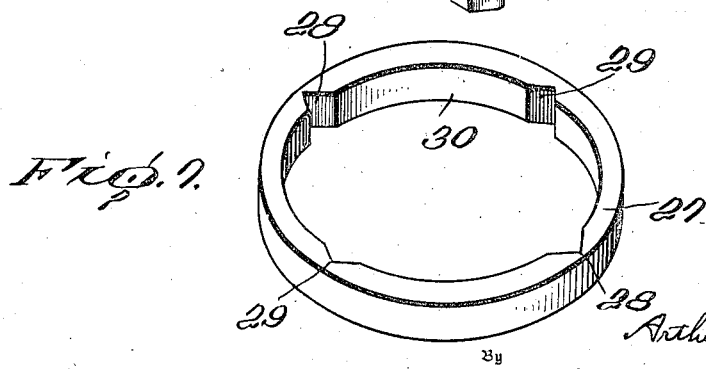
Fig. 7 is a perspective view of the stationary member for controlling the spring-actuated means bearing on the valve for flexing the same.

In Figures 8, 9 and 10 there is shown a slightly modified form of mechanism for flexing the wall of the valve. The valve housing 1 is provided with diametrically opposed ports 3 and 4. The ports 3 and 4 are controlled by a valve 7 which is turned by a valve actuating member 31. Said valve actuating member is carried by a stem 32 to which a suitable handle may be attached for turning the same. The valve 7 fits in the cylindrical chamber in the valve casing 1 and the valve chamber is closed by a cap 33 which has a threaded connection with the valve casing. The valve actuating member 31 is provided with a recess 34 in its lower end and a ball 35 is pressed by means of a spring 36 into the recess and aids in holding the valve actuating member in proper alignment with the valve casing. This valve actuating member 31 is provided with recesses 37 and 38 disposed diametrically opposite each other. Located in the recess 37 is a lever 39 which is pivoted at 40. Located in the recess 38 is a lever 41 which is pivoted at 42. A spring 43 is housed in the valve actuating member 31 and bears against said levers, normally forcing said levers outwardly into engagement with the inner surface of the valve 7. The lever 39 is provided with a V-shaped projection 44, and the lever 41 is provided with a V-shaped projection 45. A stationary ring 46 similar to the stationary ring 27 shown in Figure 7, is provided for controlling the pressure of the levers 31 and 40 against the valve. When the valve is positioned as shown in Figure 8, then the projecting portions 44 and 45 will enter the deep V-notches in the ring 46, and this will permit the levers to move outwardly into contact with the valve and flex the wall of the valve into the ports for effecting a very tight seal. When the valve actuating member is turned for opening the ports 3 and 4, the projecting members 44 and 45 on the levers will at once ride out of the V-notches onto the inner face of the ring, and this will withdraw the levers from their pressure contact with the wall of the valve and permit the wall to return to its normal cylindrical shape. The valve can, therefore, be turned very easily to the full open position.

There is a port 47 extending through the valve actuating member, and when this port is brought into centered relation to the ports 3 and 4, respectively, then the projections 44 and 45 will enter the holding V-notches in the ring and this will maintain the valve in open position with the ports in alignment. When pressure is exerted on the valve actuating member, the projecting portions on the levers will ride out of the V-notches, and the valve will again be released from the spring pressure of the levers and will turn freely in the valve casing.

As a limiting means for the turning movements of the valve actuating member 31, the lower end of said member is provided with an arc-shaped recess 48. A pin 49 fixed to the casing extends into the recess. This slot and pin are so positioned that when the pin is at the end of the slot shown in Figure 10, then the valve will be closed and the bulging portions on the levers will be positioned directly over the center of the ports so that the valve will be flexed into the ports. When the pin is at the other end of the slot, then the port 47 will be brought into centered relation and alignment with the ports 3 and 4.

It is obvious that many changes in the details of construction and arrangement of parts may be made without departing from the spirit of the invention as set forth in the appended claims.

Having thus described the invention, what I claim as new and desire to secure by Letters Patent, is:

1. A valve assembly comprising a valve casing having a cylindrical chamber with at least one port leading from said chamber through the cylindrical wall thereof, a rotary valve member including a flexible wall for closing said port, a yielding member mounted for movement with the valve member and bearing on the wall thereof for flexing the same into said port to afford a tight seal when the valve is in closed position, and a stationary control member contacting with said yielding member, said stationary member being shaped so as to release the pressure of the yielding member on the wall of the valve upon the initial turning of the valve for moving the same away from closed position.

2. A valve assembly comprising a valve casing having a cylindrical chamber with diametrically opposed ports leading therefrom, a cylindrical valve member disposed in said chamber for controlling said ports, said valve member having ports therethrough adapted to be brought into register with the ports in the casing, the wall of said valve member between the ports being flexible, means for turning said valve for opening and closing the ports, spring means located within the valve member and mounted for movement therewith, said spring means being positioned so as to bear on the wall of the valve member for flexing the same into the ports for affording a tight seal when the valve is in closed position, and a stationary control member contacting with said spring means and shaped so as to release the pressure of the spring means on the wall of the valve upon the initial turning of the valve for moving the same away from closed position.

3. A valve assembly comprising a valve casing having a cylindrical chamber with diametrically opposed ports leading therefrom, a cylindrical valve member disposed in said chamber for controlling said ports, said valve member having ports therethrough adapted to be brought into register with the ports in the casing, the wall of said valve member between the ports being flexible, means for turning said valve for opening and closing the ports, spring means located within the valve member and mounted for movement therewith, said spring means being positioned so as to bear on the wall of the valve member for flexing the same into the ports for affording a tight seal when the valve is in closed position, said spring means having depending arms and a stationary control member contacting with said arms and shaped so as to permit the spring means to engage the wall of the valve when the valve is in closed position and for withdrawing the spring means from pressure against the valve upon the initial turning of the valve for moving the same away from closed position.

4. A valve assembly comprising a valve casing having a cylindrical chamber with diametrically opposed ports leading therefrom, a cylindrical valve member disposed in said chamber for controlling said ports, said valve member having ports therethrough adapted to be brought into register with the ports in the casing, the wall of said valve member between the ports being flexible, means for turning said valve for opening and closing the ports, spring means located within the valve member and mounted for movement therewith, said spring means being positioned so as to bear on the wall of the valve member for flexing the same into the ports for affording a tight seal when the valve is in closed position, said spring means having depending arms and a stationary ring having V-shaped grooves formed therein positioned so as to permit said arms to move outward and the spring means to engage the wall of the valve when the valve is in closed position, said arms moving out of the V-notches upon the initial turning movement of the valve for releasing the pressure of the spring means on the wall of the valve.

5. A valve assembly comprising a valve casing having a cylindrical chamber with diametrically opposed ports leading therefrom, a cylindrical valve member disposed in said chamber for controlling said ports, said valve member having ports therethrough adapted to be brought into register with the ports in the casing, the wall of said valve member between the ports being flexible, means for turning said valve for opening and closing the ports, spring means located within the valve member and mounted for movement therewith, said spring means being positioned so as to bear on the wall of the valve member for flexing the same into the ports for affording a tight seal when the valve is in closed position, said spring means having depending arms and a stationary ring having V-shaped grooves formed therein positioned so as to permit said arms to move outward and the spring means to engage the wall of the valve when the valve is in closed position, said arms moving out of the V-notches upon the initial turning movement of the valve for releasing the pressure of the spring means on the wall of the valve, said ring having V holding notches formed therein with which the arms engage when the ports in the valve are brought into alignment with the ports in the valve casing.

6. A valve assembly comprising a valve casing having a cylindrical chamber with diametrically opposed ports leading therefrom, a cylindrical valve member disposed in said chamber for controlling said ports, said valve member having ports therethrough adapted to be brought into register with the ports in the casing, the wall of said valve member between the ports being flexible, means for turning said valve for opening and closing the ports, a U-shaped spring member located within the valve member and mounted for movement therewith, said spring member having bulging portions adapted to bear on the wall of the valve for flexing the same into the ports for affording a tight seal when the valve is in closed position, said spring means having depending arms, and a stationary control member contacting with the arms and shaped so as to release the pressure of the spring means on the wall of the valve upon the initial turning of the valve for moving the same away from closed position.

7. A valve assembly comprising a valve casing having a cylindrical chamber with diametrically opposed ports leading therefrom, a cylindrical valve member disposed in said chamber for controlling said ports, said valve member having ports therethrough adapted to be brought into register with the ports in the casing, the wall of said valve member between the ports being flexible, means for turning said valve for opening and closing the ports, a U-shaped spring member located within the valve member and mounted for movement therewith, said spring member having bulging portions adapted to bear on the wall of the valve for flexing the same into the ports for affording a tight seal when the valve is in closed position, said spring means having depending arms, a stationary ring having V-notches formed therein and disposed so that the arms of the spring member will move into the notches when the valve is in closed position and permit said spring member to flex the valve wall into the ports, said ring operating upon said arms to move the spring means so as to release the pressure on the wall of the valve upon the initial turning of the valve for moving the same away from closed position.

8. A valve assembly comprising a valve casing having a cylindrical chamber with diametrically opposed ports leading therefrom, a cylindrical valve member disposed in said chamber for controlling said ports, said valve member having ports therethrough adapted to be brought into register with the ports in the casing, the wall of said valve member between the ports being flexible, means for turning said valve for opening and closing the ports, a U-shaped spring member located within the valve member and mounted for movement therewith, said spring member having bulging portions adapted to bear on the wall of the valve for flexing the same into the ports for affording a tight seal when the valve is in closed position, said spring means having depending arms, a stationary ring having V-notches formed therein and disposed so that the arms of the spring member will move into the notches when the valve is in closed position and permit said spring member to flex the valve wall into the ports, said ring operating upon said arms to move the spring means so as to release the pressure on the wall of the valve upon the initial turning of the valve for moving the same away from closed position, said ring having V holding notches into which said arms move when the ports in the valve member are brought into alignment with the ports in the casing.

9. A valve assembly comprising a valve casing having a cylindrical chamber with a port leading therefrom, a cylindrical valve for controlling the port, said valve having a flexible wall, means for flexing the wall into the port when the valve is in closed position, said port being oval in cross section with the major axis thereof extending lengthwise of the cylindrical valve, said oval port being shaped so that the line of contact between the cylindrical valve and the edge of the port is at all points, substantially the same distance from the point where the axis of the port intersects the valve cylinder.

10. A valve assembly comprising a valve casing having a cylindrical chamber with diametrically opposed ports leading therefrom, a cylindrical valve member disposed in said chamber for controlling said ports, said valve member having ports therethrough adapted to be brought into register with the ports in the casing, the wall of said valve member between the ports being flexible, means for turning said valve for opening and closing the ports, pivoted arms mounted on and movable with said valve, said arms having bulging portions adapted to contact with the wall of the valve for flexing the same into the ports for affording a tight seal when the valve is in closed position, said arms having projecting portions at the lower ends thereof, a spring contacting with said arms and normally forcing the same outward for causing the arms to flex the wall of the cylinder, a stationary control member contacting with the projecting means on the arms and shaped so as to permit the arms to move outward for flexing the wall of the valve when said valve is in closed position, and operating to move said arms inward for releasing the pressure thereof on the wall upon the initial turning of the valve for moving the same away from closed position.

11. A valve assembly comprising a valve casing having a cylindrical chamber with diametrically opposed ports leading therefrom, a cylindrical valve member disposed in said chamber for controlling said ports, said valve member having ports therethrough adapted to be brought into register with the ports in the casing, the wall of said valve member between the ports being flexible, means for turning said valve for opening and closing the ports, pivoted arms mounted on and movable with said valve, said arms having bulging portions adapted to contact with the wall of the valve for flexing the same into the ports for affording a tight seal when the valve is in closed position, said arms having projecting portions at the lower ends thereof, a spring contacting with said arms and normally forcing the same outward for causing the arms to flex the wall of the cylinder, a control ring contacting with the projecting portions of said arms and having V-shaped grooves into which the projections move so as to permit the arms to bear on the wall of the valve for flexing the same and for moving said arms inward to release the pressure on the wall when said valve is turned for moving the same away from closed position.

12. A valve assembly comprising a valve casing having a cylindrical chamber with diametrically opposed ports leading therefrom, a cylindrical valve member disposed in said chamber for controlling said ports, said valve member having ports therethrough adapted to be brought into register with the ports in the casing, the wall of said valve member between the ports being flexible, means for turning said valve for opening and closing the ports, pivoted arms mounted on and movable with said valve, said arms having bulging portions adapted to contact with the wall of the valve for flexing the same into the ports for affording a tight seal when the valve is in closed position, said arms having projecting portions at the lower ends thereof, a spring contacting with said arms and normally forcing the same outward for causing the arms to flex the wall of the cylinder, a control ring contacting with the projecting portions of said arms and having V-shaped grooves into which the projections move so as to permit the arms to bear on the wall of the valve for flexing the same and for moving said arms inward to release the pressure on the wall when said valve is turned for moving the same away from closed position, said ring having V-holding notches therein into which the projecting portions on the arms move when the ports in the valve are in alignment with the ports in the valve casing.

ARTHUR L. PARKER.